US007599659B2

(12) United States Patent
Wang et al.

(10) Patent No.: US 7,599,659 B2
(45) Date of Patent: Oct. 6, 2009

(54) INNOVATIVE COMBINATIONAL CLOSED-LOOP AND OPEN-LOOP SATELLITE USER TERMINAL POWER CONTROL SYSTEM

(75) Inventors: Weizheng W. Wang, El Segundo, CA (US); Anchung Chang, San Gabriel, CA (US); Ying J. Feria, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 11/078,865

(22) Filed: Mar. 10, 2005

(65) Prior Publication Data

US 2006/0203921 A1 Sep. 14, 2006

(51) Int. Cl.
H04B 7/185 (2006.01)
(52) U.S. Cl. .................. 455/13.4; 455/69; 455/3.02; 455/67.13
(58) Field of Classification Search ............ 455/13.1, 455/13.4, 522, 427, 12.1, 69, 63, 3.01, 3.02, 455/430, 24, 517, 63.1, 67.13; 370/318, 370/321
See application file for complete search history.

(56) References Cited

U.S. PATENT DOCUMENTS

| 4,228,538 A | 10/1980 | Scharla-Nielsen |
| 4,261,054 A | 4/1981 | Scharla-Nielsen |
| 5,481,561 A | 1/1996 | Fang |
| 5,835,846 A | 11/1998 | Furukawa et al. |
| 5,956,619 A | 9/1999 | Gallagher et al. |
| 6,085,067 A * | 7/2000 | Gallagher et al. .......... 455/13.1 |
| 6,088,573 A | 7/2000 | Tsuda |
| 6,108,561 A | 8/2000 | Mallinckrodt |
| 6,219,528 B1 | 4/2001 | Wright et al. |
| 6,335,920 B1 | 1/2002 | Strodtbeck et al. |
| 6,430,418 B1* | 8/2002 | Nivens et al. .............. 455/522 |
| 6,829,226 B1* | 12/2004 | Apostolides et al. ........ 370/318 |
| 2003/0040274 A1* | 2/2003 | Dai et al. ................... 455/13.4 |

* cited by examiner

*Primary Examiner*—John Lee
(74) *Attorney, Agent, or Firm*—Yee & Associates, P.C.; John A. Lepore

(57) ABSTRACT

Devices and methods are disclosed for reducing power control cushion of a user terminal configured to communicate with a satellite and a gateway station. The present invention provides a power control algorithm implemented in a user terminal that is designed to operate in a satellite communication system. The power control algorithm can recursively calculate a returnlink power to reduce a power control cushion so that an extra link margin is available to the satellite communication system. The present invention also provides a source coding technique that provides an accurate feedback signal for the user terminal. The average metric of input signal frames is coded in a sequence of bits that are carried by contiguous output signal frames.

24 Claims, 10 Drawing Sheets

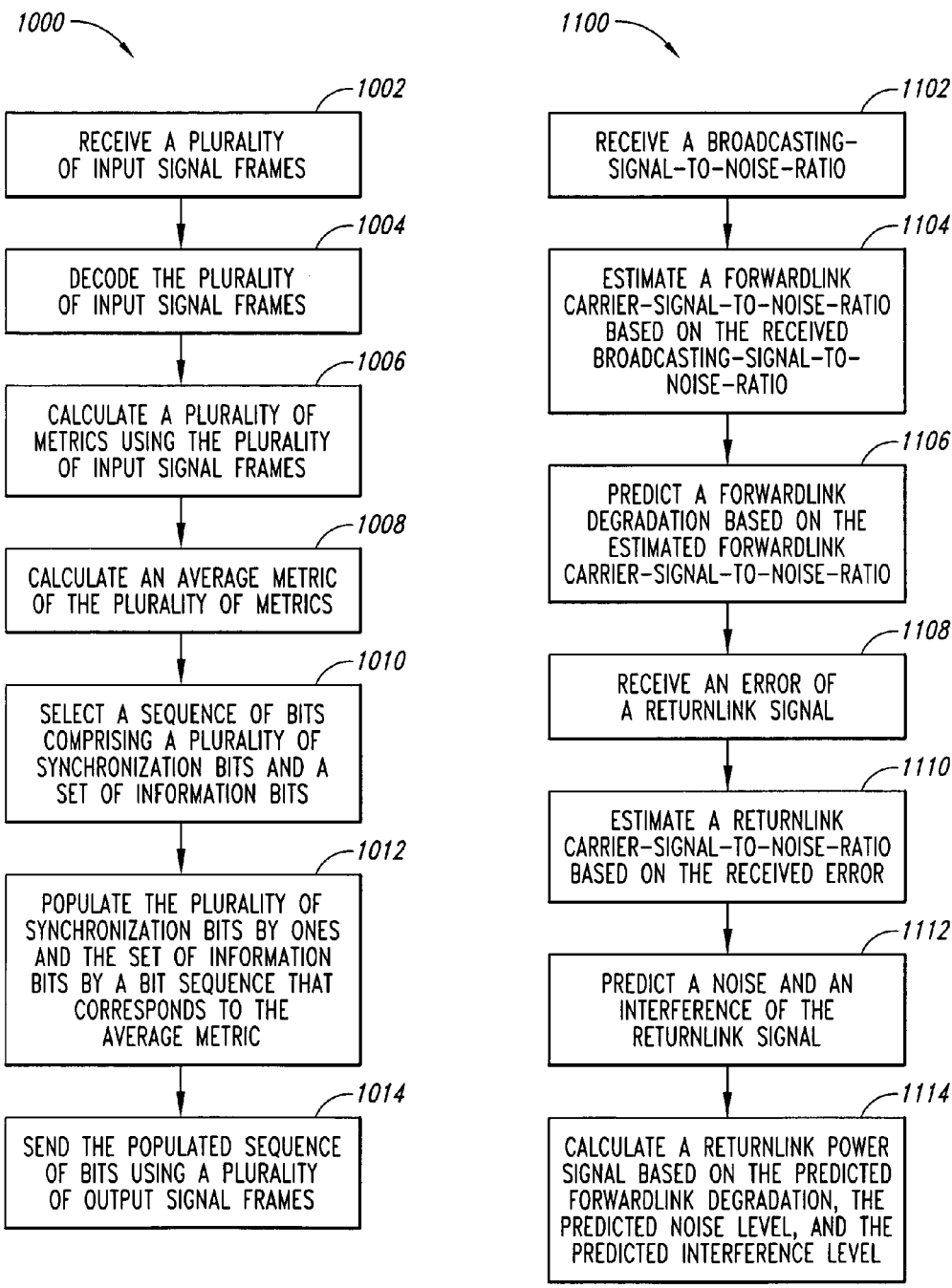

INNOVATIVE COMBINATIONAL CLOSED-LOOP AND OPEN-LOOP SATELLITE USER TERMINAL POWER CONTROL SYSTEM

BACKGROUND OF THE INVENTION

The present invention generally relates to a wireless communication system and, more particularly, to a user terminal power control system with a predictive closed-loop and adaptive correlation open-loop approach.

There are presently many different types of radiotelephones or wireless communication systems, including different terrestrial based wireless communication systems and satellite communication systems.

The CDMA2000, an exemplary cellular system, is a communication protocol and specifies the technical requirements that form a compatibility standard for CDMA systems. One of the technical requirements specified in CDMA2000 is allocating one bit per data package (or, equivalently, frame) to specify the status of signal power strength. FIG. 1 is schematic diagram of a typical terrestrial wireless communication system 100, where user terminals 104, such as cellular phones, Personal Digital Assistants (PDAs), etc., communicate with each other via a gateway station 102.

In the communication system 100, each user terminal 104 exchanges a data package (or, equivalently, frame) with the base station 102 at each time interval that is about 20 milliseconds in CDMA2000 system. To conform to the CDMA2000 requirements, each data package contains one bit dedicated to indicate the received signal quality (or, equivalently, transmission power level). The data contained in the one bit may be used by the receiver to adjust the transmission power level of the following data package. Thus, one cycle of data exchange makes a closed feedback loop to adjust the transmission power levels of the communicating user terminals 104. The adjustment of signal level is required to minimize the interference between the user terminals 104 and, consequently enhance the quality of communications therebetween. A weak signal level fails to provide clear communication between each user terminal 104 and the base station 102, while an excessively strong signal from one user terminal may produce an undesirable interference to other user terminals. As the power control cannot be perfect, for each communication system design, some additional power allowance is placed to allow the power control error. The additional power allowance is known as power control cushion. It is clear that for power use efficiency and for system reaching a high performance and high capacity level, the power control cushion should be as small as possible.

In the terrestrial wireless communication system 100, the time delay of the closed feedback loop can be just a matter of tens of milliseconds and, as a consequence, the closed feedback loop power control can promptly adjust its power level to adapt the environmental change. In contrast, the time delay of the closed-loop methods for existing satellite communication systems can be significant. For example, in a typical GEO satellite communication system, the feedback closed-loop delay is about ¼ second for a single hopping method and about ½ second for a double hopping method. With such a long feedback time delay, a well-designed conventional closed-loop method by itself may fail to provide a satisfactory power control and at least a 2-dB power control cushion is required.

In the design of a satellite system, closing the link budget while providing the largest possible transmission capacity has been a challenging problem to engineers. In addition, the transmission power limitation may compound the difficulty of the problem. Analysis shows that in a GEO Mobile system, with other resources the same, a reduction of the power control cushion by 1-dB can double the system capacity.

Therefore, there is a need to complement the long loop delay effect in the power control system so that the power control cushion can be reduced and, consequently, the system capacity can be increased and the quality of service can be enhanced.

SUMMARY OF THE INVENTION

The present invention provides an innovative communication system power control architecture for a communication system with long transmission delay. The proposed system architecture uses the conventional closed-loop power control scheme as well as open-loop power control scheme. The migrated results of the closed-loop and the open-loop control schemes are used to effectively reduce the required power control cushion. This architecture includes the algorithms for user terminals, for satellites and/or gateway station, and the coordination between the user terminals and a satellite and/or gateway station.

The present invention also provides a power control algorithm implemented in a user terminal that can communicate with a satellite and a gateway station in a real-time basis. The power control algorithm can recursively calculate a returnlink power to reduce a power control cushion so that the system capacity and system performance of the designed satellite communication system can be improved. The present invention also provides a source coding technique that provides an accurate feedback signal for the user terminal. The average metric of input signal frames is coded in a sequence of bits that are carried by contiguous output signal frames.

In one aspect of the present invention, a method for coding an average metric value of a plurality of input signal frames includes steps of: receiving a plurality of input signal frames; decoding the plurality of input signal frames; calculating a plurality of metrics using the plurality of input signal frames; calculating an average metric of the plurality of metrics; selecting a sequence of bits comprising a plurality of synchronization bits and a set of information bits; populating the sequence of bits, the set of information bits corresponding to the average metric; and sending the sequence of bits using a plurality of output signal frames.

In another aspect of the present invention, a computer readable medium embodying program code with instructions for coding an average metric value of a plurality of input signal frames includes: program code for receiving a plurality of input signal frames; program code for decoding the plurality of input signal frames; program code for calculating a plurality of metrics using the plurality of input signal frames; program code for calculating an average metric of the plurality of metrics; program code for selecting a sequence of bits comprising a plurality of synchronization bits and a set of information bits; program code for populating the sequence of bits, the set of information bits corresponding to the average metric; and program code for sending the sequence of bits using a plurality of output signal frames.

In still another aspect of the present invention, a method for controlling a returnlink power of a user terminal includes steps of: receiving a broadcasting-signal-to-noise-ratio; estimating a forwardlink carrier-signal-to-noise-ratio based on the broadcasting-signal-to-noise-ratio; predicting a forwardlink degradation based on the forwardlink carrier-signal-to-noise-ratio; receiving an error of a returnlink signal; estimating a returnlink carrier-signal-to-noise-ratio based on the error; predicting a noise and interference of the returnlink signal; and calculating a returnlink power signal based on the forwardlink degradation, noise and interference.

In yet another aspect of the present invention, a computer readable medium embodying program code with instructions for controlling a returnlink power includes: program code for receiving a broadcasting-signal-to-noise-ratio; program code for estimating a forwardlink carrier-signal-to-noise-ratio based on the received broadcasting-signal-to-noise-ratio; program code for predicting a variation of forwardlink degradation based on a variation of the forwardlink carrier-signal-to-noise-ratio; program code for receiving an error of a returnlink signal; program code for estimating a returnlink carrier-signal-to-noise-ratio based on the received error; program code for predicting a noise and interference of the returnlink signal; and program code for calculating a returnlink power signal based on the forwardlink degradation, noise and interference.

In another aspect of the present invention, a satellite communication system includes: a satellite; and at least one user terminal comprising: a forwardlink receiver configured to receive a forwardlink broadcasting signal and a forwardlink user-data transmission signal from the satellite; a returnlink power control configured to generate a returnlink power signal based on the forwardlink broadcasting signal and the forwardlink user-data transmission signal; and a returnlink transmission configured to send the returnlink power signal to the satellite.

In another aspect of the present invention, a satellite communication system includes: a satellite; at least one user terminal configured to communicate with the satellite via a channel, the at least one user terminal comprising: a forwardlink receiver configured to receive a forwardlink broadcasting signal and a forwardlink user-data transmission signal from the satellite; a returnlink power control configured to generate a returnlink power signal based on the forwardlink broadcasting signal and the forwardlink user-data transmission signal; and a returnlink transmission configured to send the returnlink power signal to the satellite; and a gateway station configured to communicate with the satellite comprising: a feederlink receiver configured to receive a signal from the satellite; and a feederlink transmission configured to receive a metric and a pilot tune signal power from the feederlink receiver and send a signal to the satellite.

In another aspect of the present invention, a method for coding an average metric value of a plurality of input signal frames includes steps of: receiving a plurality of input signal frames; decoding the received plurality of input signal frames; calculating a plurality of metrics using the decode plurality of input signal frames; calculating an average metric of the calculated plurality of metrics; coding the calculated average metric; and sending the coded average metric using a plurality of output signal frames.

In another aspect of the present invention, a method for coding an average metric value of a plurality of input signal frames includes steps of: receiving a plurality of input signal frames; decoding the received plurality of input signal frames; calculating a plurality of metrics using the decode plurality of input signal frames; calculating an average metric of the calculated plurality of metrics; selecting a sequence of bits comprising a plurality of synchronization bits and a set of information bits; assigning ones to the plurality of synchronization bits; populating the set of information bits in accordance with the average metric; and sending the populated sequence of bits using a plurality of output signal frame.

In another aspect of the present invention, a method for controlling a returnlink power of a user terminal includes steps of: receiving a broadcasting-signal-to-noise-ratio; estimating a forwardlink carrier-signal-to-noise-ratio based on the received broadcasting-signal-to-noise-ratio; predicting a forwardlink degradation based on the estimated forwardlink carrier-signal-to-noise-ratio; receiving an error of a returnlink signal; estimating a returnlink carrier-signal-to-noise-ratio based on the received error; predicting a noise and an interference of the returnlink signal; calculating a returnlink power signal based on the predicted forwardlink degradation, the predicted noise level, and the predicted interference level; using the calculated returnlink power signal in the steps of estimating a returnlink carrier-signal-to-noise-ratio, predicting a forwardlink degradation, and predicting a noise and an interference; and estimating a set of model parameters to adjust the noise, interference, and a dynamic degradation based on an adaptive filter such as a Kalman filter.

In another aspect of the present invention, a method for controlling a returnlink power of a user terminal includes steps of: receiving a returnlink error and a returnlink power; estimating a returnlink carrier-signal-to-noise-ratio based on the returnlink error and returnlink power; predicting a noise and interference of the returnlink power based on the returnlink carrier-signal-to-noise-ratio and the returnlink power; receiving a forwardlink power; estimating a forwardlink carrier-signal-to-noise-ratio based on the forwardlink power; calculating adaptively a correlation between a variation of the forwardlink power and a variation of the returnlink power; predicting a forwardlink degradation based on the forwardlink carrier-signal-to-noise-ratio, the correlation and the returnlink power; and computing a returnlink power based on the noise, the interference and the forwardlink degradation.

In another aspect of the present invention, a computer readable medium embodying program code with instructions for controlling a returnlink power includes: program code for receiving a returnlink error and a returnlink power; program code for estimating a returnlink carrier-signal-to-noise-ratio based on the returnlink error and returnlink power; program code for predicting a noise and interference of the returnlink power based on the returnlink carrier-signal-to-noise-ratio and the returnlink power; program code for receiving a forwardlink power; program code for estimating a forwardlink carrier-signal-to-noise-ratio based on the forwardlink power; program code for calculating adaptively a correlation between a variation of the forwardlink power and a variation of the returnlink power; program code for predicting a forwardlink degradation based on the forwardlink carrier-signal-to-noise-ratio, the correlation and the returnlink power; and program code for computing a returnlink power based on the noise, the interference and the forwardlink degradation.

These and other features, aspects and advantages of the present invention will become better understood with reference to the following drawings, description and claims.

BRIEF DESCRIPTION OF THE DRAWINGS

FIG. 10 is a flowchart illustrating exemplary steps for metric feedback source coding in accordance with one embodiment of the present invention.

FIG. 11 is a flowchart illustrating exemplary steps for controlling the returnlink power of a user terminal in accordance with one embodiment of the present teachings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an algorithm to reduce a returnlink power control cushion so that an extra link margin is available to a satellite communication system, where the extra link margin can enhance the capacity of the system and quality of the service. In contrast to the existing systems, the present invention implements an open loop estimation model as well as the closed loop model to control the transmission power. (Hereinafter, the term "returnlink" refers to sending a signal to a satellite.) In addition, the present invention provides a source coding technique that provides an accurate feedback signal for a user terminal.

Figure 1:
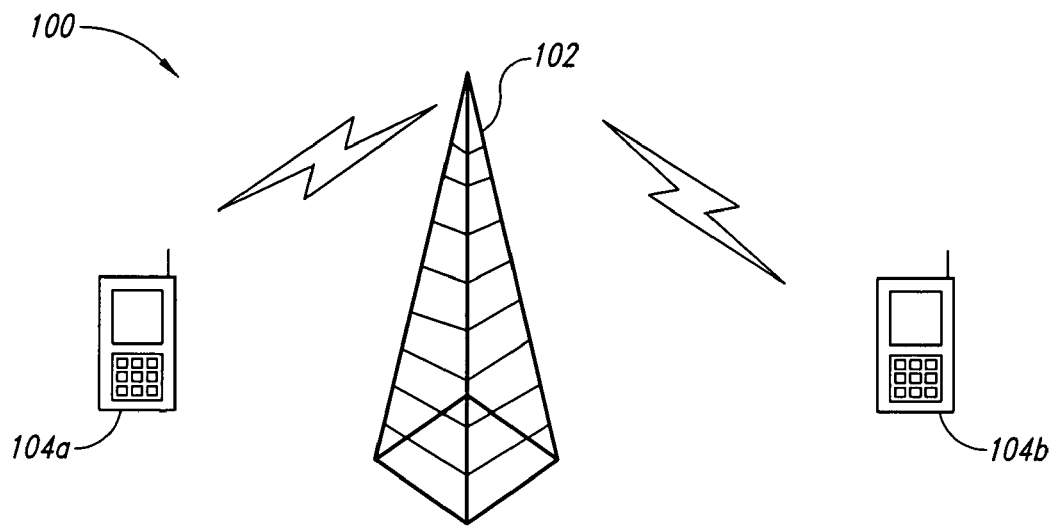
FIG. 1 is a schematic diagram of a conventional terrestrial wireless communication system.
Figure 2:
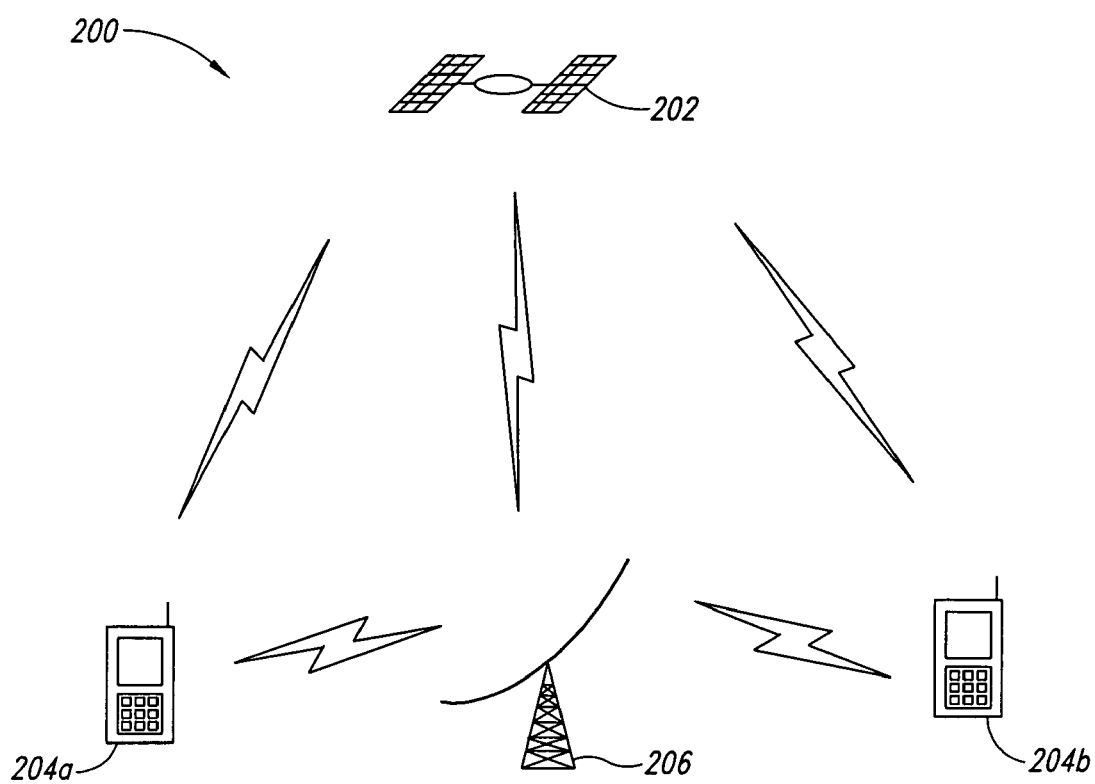
FIG. 2 is a schematic diagram of a satellite communication system in accordance with one embodiment of the present invention.

FIG. 2 is a schematic diagram of a satellite communication system 200 in accordance with one embodiment of the present invention. As illustrated in FIG. 2, the system 200 may include: user terminals 204, such as Personal Digital Assistants (PDAs) or cellular phones; a satellite 202 (or, equivalently, a spacecraft); and a gateway station 206. For simplicity, only two user terminals and one gateway station are shown in FIG. 2. However, it should be apparent to those of ordinary skill that the present invention may be practiced with any number of user terminals and gateway stations. Each of the user terminals 204 and the gateway station 206 may send a communication signal to the satellite 202. Hereinafter, the term "forwardlink" refers to sending a signal to the gateway station 206 or user terminal 204. Likewise, the satellite 202 may send a communication signal to each of the user terminal 204 and/or the gateway station 206.

Figure 3:
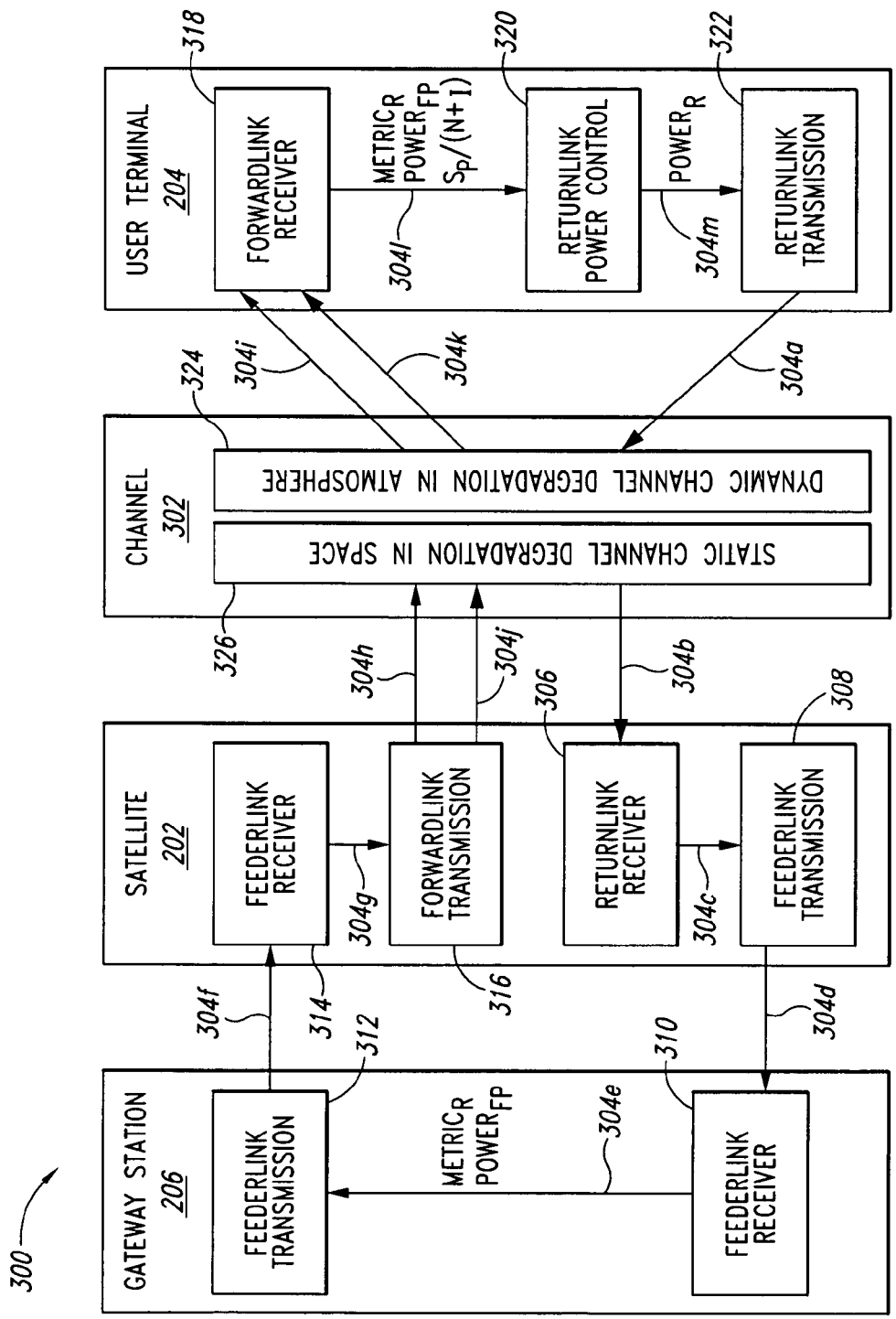
FIG. 3 is a schematic diagram illustrating a power control information flow between components of the communication system of FIG. 2.

FIG. 3 is a schematic diagram 300 illustrating a power control information flow between the components of the communication system shown in FIG. 2. As indicated by arrows 304a and 304b, the returnlink transmission 322 of a user terminal 204 may send a signal to the returnlink receiver 306 of a satellite 202 through a channel 302. Then, the returnlink receiver 306 may send the received signal to a feederlink transmission 308 as indicated by an arrow 304c. The feederlink transmission 308 may pack a set of similar signals from other user terminals 204 and send the packed signal to the feederlink receiver 310 of the gateway station 206 as indicated an arrow 304d. Upon receipt of the packed signal, the gateway station 206 may unpack the received signal and process the unpacked signal prior to sending to a feederlink transmission 312 as indicated by an arrow 304e, where the process may include the steps of evaluating the intensity level of each signal and adding a returnlink channel decoding metric $Metric_R$ and a transmission power for pilot tune (or, equivalently, broadcasting) signal $Power_{FP}$ (or, briefly $P_{FP}$) to the unpacked signal. Hereinafter, the subscript "R" and "FP" refer to the returnlink and the forwardlink pilot tone signal (or, equivalently, a broadcasting signal from the satellite 202). The value of $Metric_R$ may be carried by one bit per frame and indicate the intensity level of a returnlink signal that is sent by the user terminal 204 to the satellite 202. The $Metric_R$ may be available when the returnlink information is processed and may have a time delay as will be explained later. The $P_{FP}$ may be considered as a constant or a slowly changing quantity for most of the communication systems. The broadcasting-signal-to-noise-and-interference-level $S_{FP}/(N_{FP}+I_{FP})$ may be measured at the user terminal 204. Also, the broadcasting signal change may be considered as a change in the degradation of the channel 302, which may be used for an open-loop power control. Details of the open-loop power control will be given later.

As indicated by an arrow 304f, the feederlink transmission 312 may send a processed signal to the feederlink receiver 314 of the satellite 202. Then, the feederlink receiver 314 may send the received signal to a forwardlink transmission 316 that can be an antenna, as indicated by an arrow 304g. Subsequently, the forwardlink transmission 316 may send two signals: a forwardlink broadcasting signal and forwardlink user-data transmission signal as indicated by arrows 304h and 304j, respectively. Typically, the forwardlink broadcasting signal may be sent to every user terminal 204. These two signals may go through the channel 302 and be received by a forwardlink receiver 318 as indicated by arrows 304i and 304k. The forwardlink receiver 318 may decode the received signals and make some measurements before sending the decoded signal to a returnlink power control 320 as indicated by an arrow 304l. Then, as indicated by an arrow 304m, the returnlink power control 320 may send the information of a returnlink transmission power $P_R$ to the returnlink transmission 322.

The flow chart 300 shows a double hopping closed-loop satellite communication system. In an alternative embodiment, a single hopping closed-loop satellite communication system may be used, wherein the gateway station functionality can be performed by the satellite 202.

The channel 302 may include two types of degradation mechanisms: a dynamic channel degradation 324 that may occur close to the user terminal 204 due to atmospheric and/or environmental impacts; and a static channel degradation 326 in the out-space region. From the time delay and time prediction point of view, using the forwardlink signals that are sent by the forwardlink transmission 316 to estimate the dynamic channel degradation 324 may create a short time delay while using the returnlink feedback closed-loop as defined by the arrows 304a-304m may create a long delay (¼ second for single hopping and ½ second for double hopping).

As mentioned, the return power $P_R$ may represent the power level of a signal that the user terminal 204 sends to the satellite 202 and be adjusted on a regular basis by the user terminal 204. To adjust $P_R$, a carrier-signal-to-noise-ratio, defined as $C_R/(N_R+I_R)$, may be calculated using the current $P_R$. The carrier signal $C_R$ may be the power received by the satellite 202 and calculated by an equation $C_R=P_R-D_R$, where $D_R$ is the dynamic degradation 324 of the channel 302 and estimated at each time interval of a frame length. $N_R$ and $I_R$ may represent the estimated noise and interference to the current $P_R$, respectively, and may correspond to the static degradation 326 of the channel 302. $I_R$ may also stem from other user terminals 204 that are concurrently exchanging signals with the satellite 202. As these quantities may change slowly, they may be estimated at a time interval of multiple frame length.

The quality of the broadcasting signal from the satellite 202 may be represented by a forwardlink-pilot-tone-signal-to-noise-ratio (or, equivalently, broadcasting-signal-to-noise-and-interference-level) $S_{FP}/(N_{FP}+I_{FP})$. $S_{FP}$, $N_{FP}$ and $I_{FP}$ may be the broadcasting signal intensity received by the user terminal 204, noise, and interference, respectively. These quantities may be measured by the user terminal 204.

Figure 4:
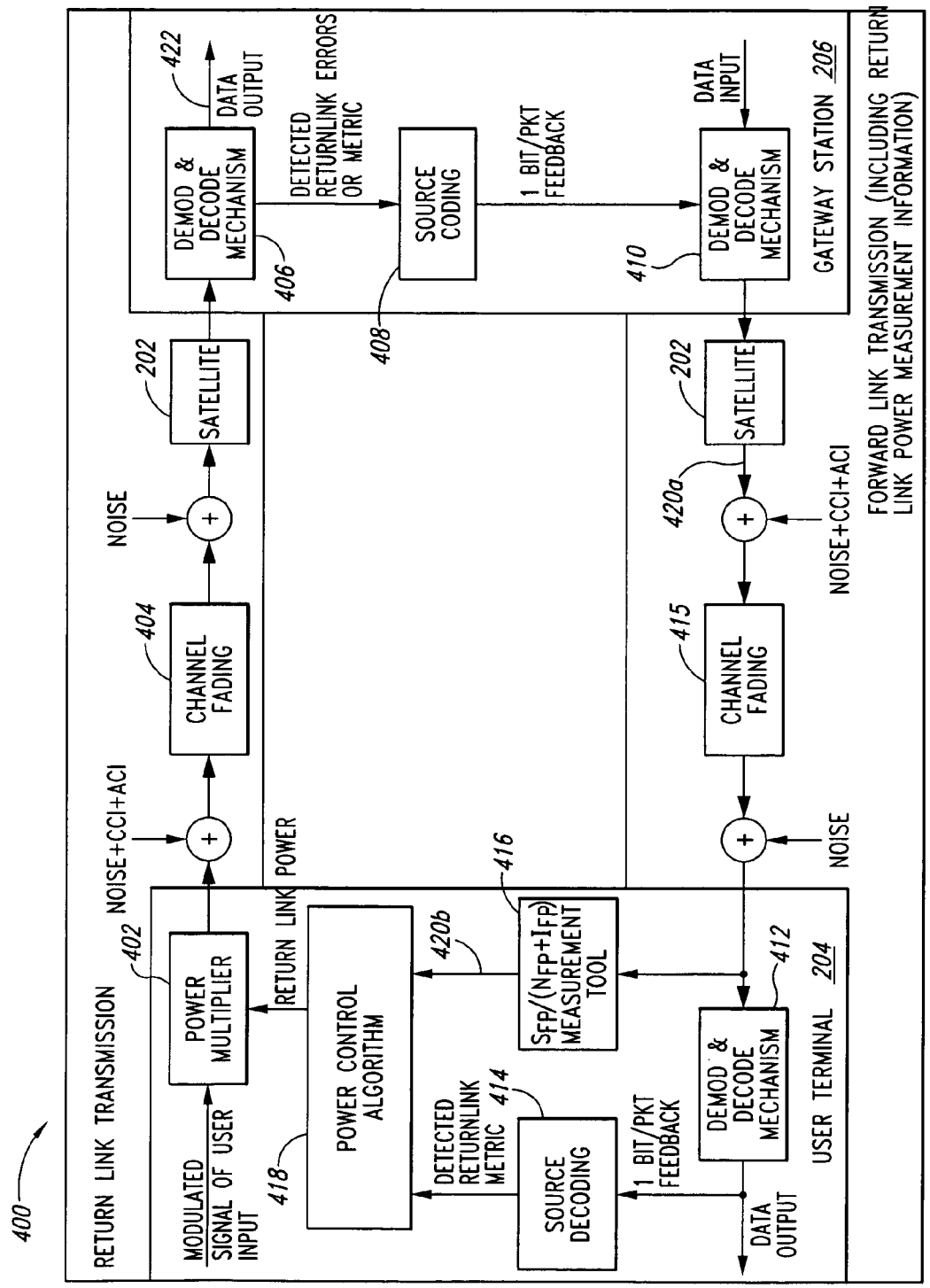
FIG. 4 is a schematic diagram illustrating a returnlink power control concept of the communication system of FIG. 2.

FIG. 4 is a schematic diagram 400 illustrating the return-link power control concept of the communication system shown in FIG. 2. A power multiplier 402 of the user terminal 204 may receive a modulated signal that may be a digitized signal of the user's voice, adjust the received signal intensity based on $P_R$ and send the signal to the satellite 202 through a channel 302 (shown in FIG. 3). During the propagation through the channel 302, the signal may be subject to a channel fading 404 due to the lengthy travel distance and other environmental sources, such as trees and clouds on the signal path. The signal may also be affected by co-channel interference (CCI) from the user terminals 204 that may use the same channel (or, equivalently, frequency band) and by adjacent channel interference (ACI) from the user terminals 204 that may use the adjacent channel.

Upon completion of signal processing in the satellite 202, the feederlink transmission 308 may send the processed signal to the gateway station 206. Subsequently, the signal is processed by the first demodulator/decoder mechanism 406 of the gateway station 206. The first demodulator/decoder mechanism 406 may output the processed signal to a party coupled thereto as indicated by an arrow 422. The first demodulator/decoder mechanism 406 may also check return-link error (or, equivalently, $\text{Metric}_R$), determine the carrier-signal-to-noise-ratio $C_R/(N_R+I_R)$ and send the ratio to a source coding 408. The source coding 408 may code the one bit dedicated to indicate the signal intensity of each frame, where the one bit may be sent to the user terminal 204 conforming to the CDMA2000 standard. The second demodulator/decoder mechanism 410 may combine the one bit data with other data input and send the combined signal to the satellite 202. Subsequently, the forwardlink transmission 316 may send the signal to the user terminal 204 through the channel 302, where the signal may be subject to a channel fading 415, noises, and interferences.

The signal received by the user terminal 204 may be used by a broadcasting-signal-to-noise-ratio measurement tool 416 and a demodulator/decoder mechanism 412. The demodulator/decoder mechanism 412 may subsequently decode the signal and output the decoded signal to the user and to a source decoding 414. The signal received by the source decoding 414 may include the one bit dedicated to indicate the signal intensity. The source decoding 414 may detect the returnlink error (or, equivalently, $\text{Metric}_R$) and send it to a power control algorithm 418. As will be explained later, the power control algorithm 418 may require a broadcasting-signal-to-noise-ratio $S_{PF}/(N_{PF}+I_{PF})$ that may be measured by a broadcasting-signal-to-noise-ratio measurement tool 416. It is noted that a closed loop may be formed by a cycle of the information flow that may start from and end at the source decoding 414. Also, an open loop may be formed to provide the power control algorithm 418 with the broadcasting-signal-to-noise-ratio, where the open loop may start from the feederlink transmission 308 that sends a signal as indicated by an arrow 420a to the power control algorithm 418 that receives the broadcasting-signal-to-noise-ratio as indicated by an arrows 420b.

Figure 5:
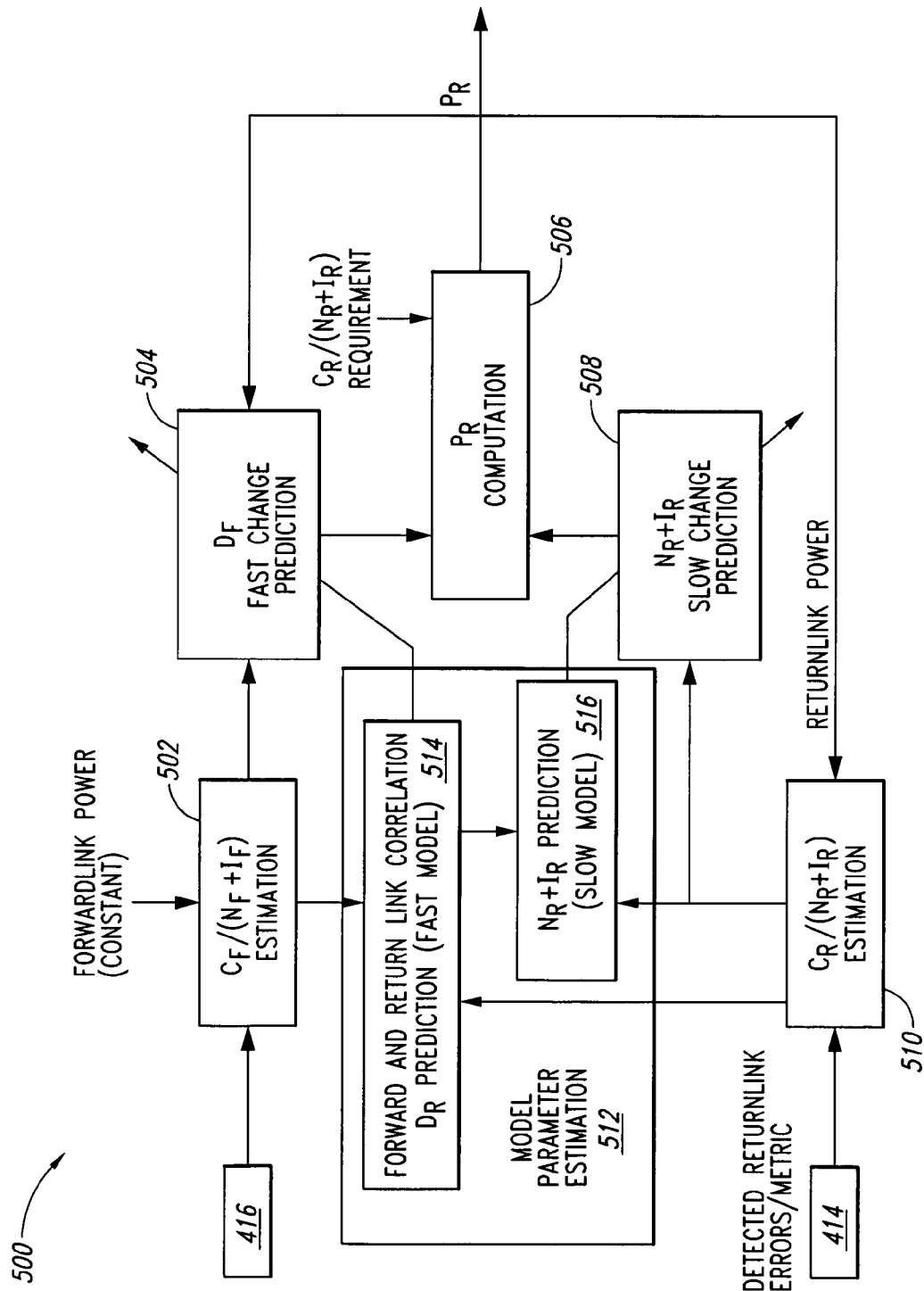
FIG. 5 is a functional block diagram illustrating a return-link power control algorithm in accordance with one embodiment of the present invention, which is further illustration of 418 showing in FIG. 4.

FIG. 5 is a functional block diagram 500 of the power control algorithm 418 in accordance with one embodiment of the present invention. The power control algorithm 418 may comprise three portions: a portion for the prediction of channel degradation $D_F$ (fast components) that includes three blocks 502, 504 and 506; a portion for the prediction of channel noise plus interference (slow components) that includes three blocks 506, 508 and 510; and a portion for updating model parameters that includes a block 512.

The power control algorithm 418 may receive a broadcasting-signal-to-noise-ratio from the mechanism 416 at the block 502 and a detected returnlink error from the source coding 414 at the block 510. Then, a forwardlink carrier-signal-to-noise-ratio $C_F/(N_F+I_F)$ and a returnlink carrier-signal-to-noise-ratio $C_R/(N_R+I_R)$ may be estimated in the blocks 502 and 510, respectively. The block 502 may also receive a forwardlink power signal that may be a constant signal. The forwardlink power signal may be based on a statistical average of the previous broadcasting signals received by the user terminal 204. Then, $C_F/(N_F+I_F)$ estimated in the block 502 may be used in the block 504 to predict a fast changing forwardlink degradation $D_F$. Subsequently, the predicted $D_F$ may be sent to the block 506 to compute a returnlink power signal $P_R$ in the block 506. The block 510 may receive the returnlink power signal $P_R$ computed in the block 506 to form a closed feedback loop. The estimated $C_R/(N_R+I_R)$ in the block 510 may be sent to the block 508 to predict the change in slow changing returnlink noise $N_R$ and interference $I_R$, which may be input to the block 506.

The block 512 may include two parameter models: forward and returnlink correlation $D_R$ prediction model (a fast model) 514 and $N_R+I_R$ prediction model (a slow model) 516. Considering bit error ratio (BER) requirement, the fast and slow models may make adjustment to the prediction of $D_R$ and $N_R+I_R$ in the blocks 504 and 508, respectively.

The mathematical models and parameters implemented in the fast model 514 and slow model 516 can be used for various transmission bandwidths and system application environments. The block 514 may estimate the weighting parameters to the forwardlink variation estimation applying to the returnlink power weighting parameter. This block may adaptively adjust the correlation between the returnlink and the forwardlink. Using the past estimation history of the correlation data and the delay feedback quality indication for the quality of the past power control calculation, the weighting parameter can be accurately estimated. A simplified model for the adjustment can be done by using adaptive filter, for example, mathematical models that are numerically stable and computationally accurate may be presented as following:

Estimation of $D_R$, the fast change portion:

The update step time is a unit time. Let's assume the internal estimation state is $X_D$, which is needed to provide one-step prediction. A mathematics expression of one step prediction can be written as $X_D(t+1) = F_D(t+1|t)X_D(t) + G_D(t+1|t)(D_{DL}(t) - D_{DL}(t-1)) + \omega_N(t)$ $Y_N(t) = X_N(t) + \epsilon_N(t)$ $D_R(t) = Y_N(t) + D_R(t-1)$ Estimation of $NI_R$ ($=N_R + I_R$) the slow change portion:

The update rate is Y (Y>X), which is need to provide k step prediction (k>=1, k times of unit time)

$X_{NI}(t+k) = F_{NI}(t+k|t)X_{NI}(t) + G_{NI}(t+k|t)(NI_{UL}(t) - NI_{UL}(t-1)) + \omega_{NI}(t)$ $Y_{NI}(t) = X_{NI}(t) + \epsilon_{NI}(t)$ $NI_R(t) = Y_{NI}(t) + NI_R(t-1)$ The notations in the above equations of Kalman filter are well known in the art for adaptively parameter adjustment and, for simplicity, detailed description will not be given. It is noted that the present invention may be practiced with other conventional types of mathematical models to compute $D_R$ and $NI_R$.

It is noted that, as the transmission frequency and the receiving frequency are not exactly the same, the open loop measured variation of a forwardlink power, which may be determined by the block 502, may not be exactly the same with the variation of the returnlink power signal $P_R$ emitted from the block 506. However, there may be a correlation between the forwardlink variation and returnlink variation. The correlation may be closely related to the frequency separation between the returnlink frequency and forwardlink frequency, related to the environment. The power control algorithm 418, more specifically the forward-and-return-link-correlation $D_R$ prediction block 514, may adaptively calculate the correlation using the delayed feedback measurement.

Figure 6:
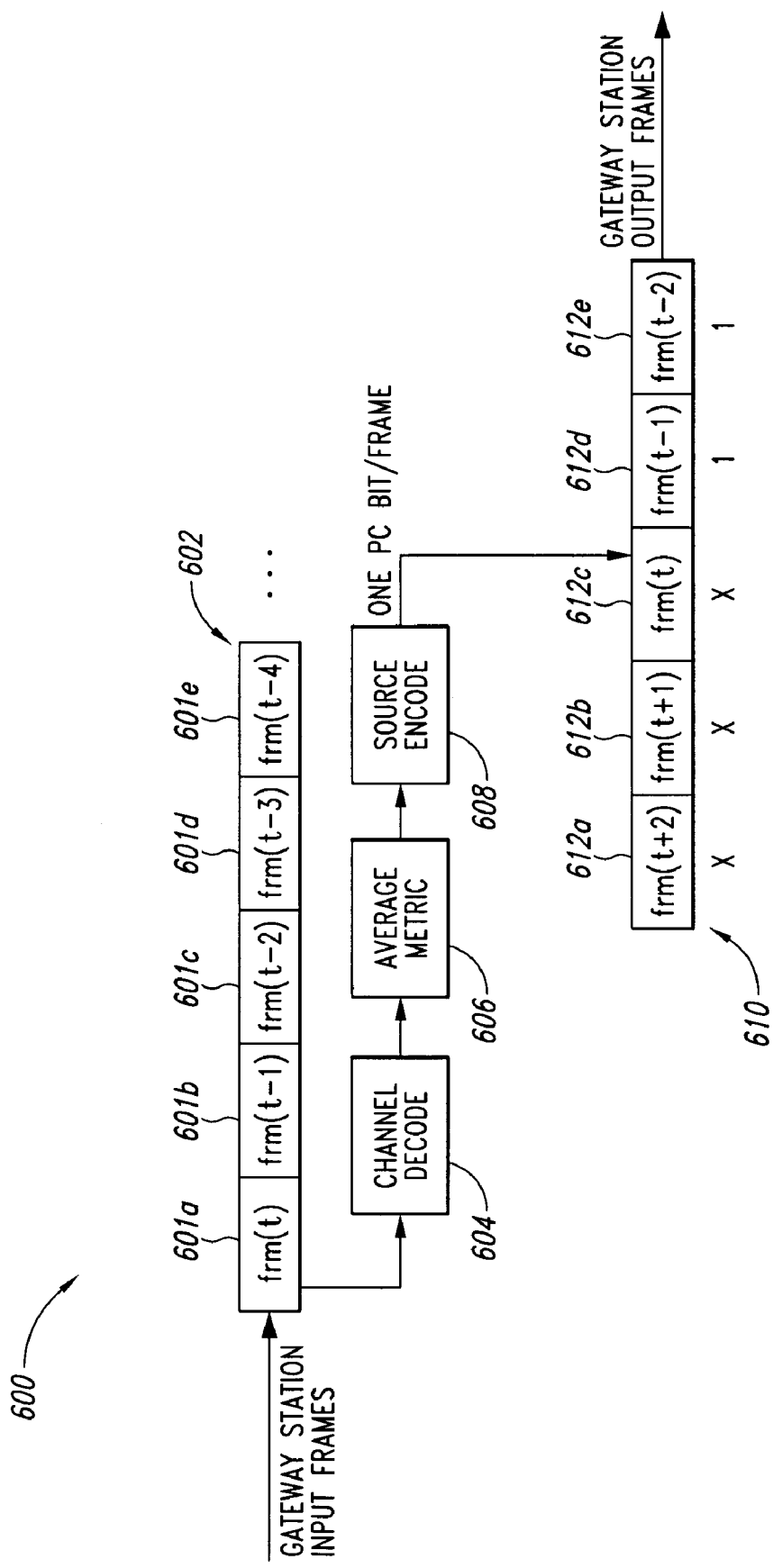
FIG. 6 is a schematic diagram illustrating an exemplary metric feedback source coding in accordance with one embodiment of the present invention.

FIG. 6 is a schematic diagram 600 illustrating an exemplary metric feedback source coding in accordance with one embodiment of the present invention. The gateway station 206 may receive input frames 602 through each channel and each input frame may be decoded to determine its BER metric in a functional block 604. Then, a contiguous set of frames 601a-601e may be selected, where the notation "t" in the input frames 602 represents the (current) time when the present feedback source coding is performed. In blocks 606 and 608, the average metric of the selected five frames 601a-601e may be calculated and encoded.

Table 1 shows an exemplary 5-bit source coding for the average metric, where each of the 5 bits may be stored in one of the five consecutive output frames 610. As shown in the second column of Table 1, the first two bits may be used as synchronization bits to identify the starting of the feedback bits while the other three bits may be used as information bits. The synchronization bits may be carried by two frames 612d and 612e before the current time "t" if the information bit is available. The first column of Table 1 represents the values represented by the three information bits and the third column represents the corresponding average metric values. As the three information bits may be carried by three consecutive output frames 612a-612c, the source coding method may generate a transmission process delay by a three-frame interval. In FIG. 6, only five frames 601a-601e is used to generate the average BER metric. However, it should be apparent to those of ordinary skill that the present invention may be practiced with any number of frames.

TABLE 1

An exemplary source coding for a metric

| Value of information bits | Bit sequence | Metric value |
|---|---|---|
| 0 | 11000 | 0 |
| 1 | 11001 | 10 |
| 2 | 11010 | 18 |
| 3 | 11011 | 24 |
| ... | ... | ... |
| 7 | 11111 | 40 |

Figure 7:
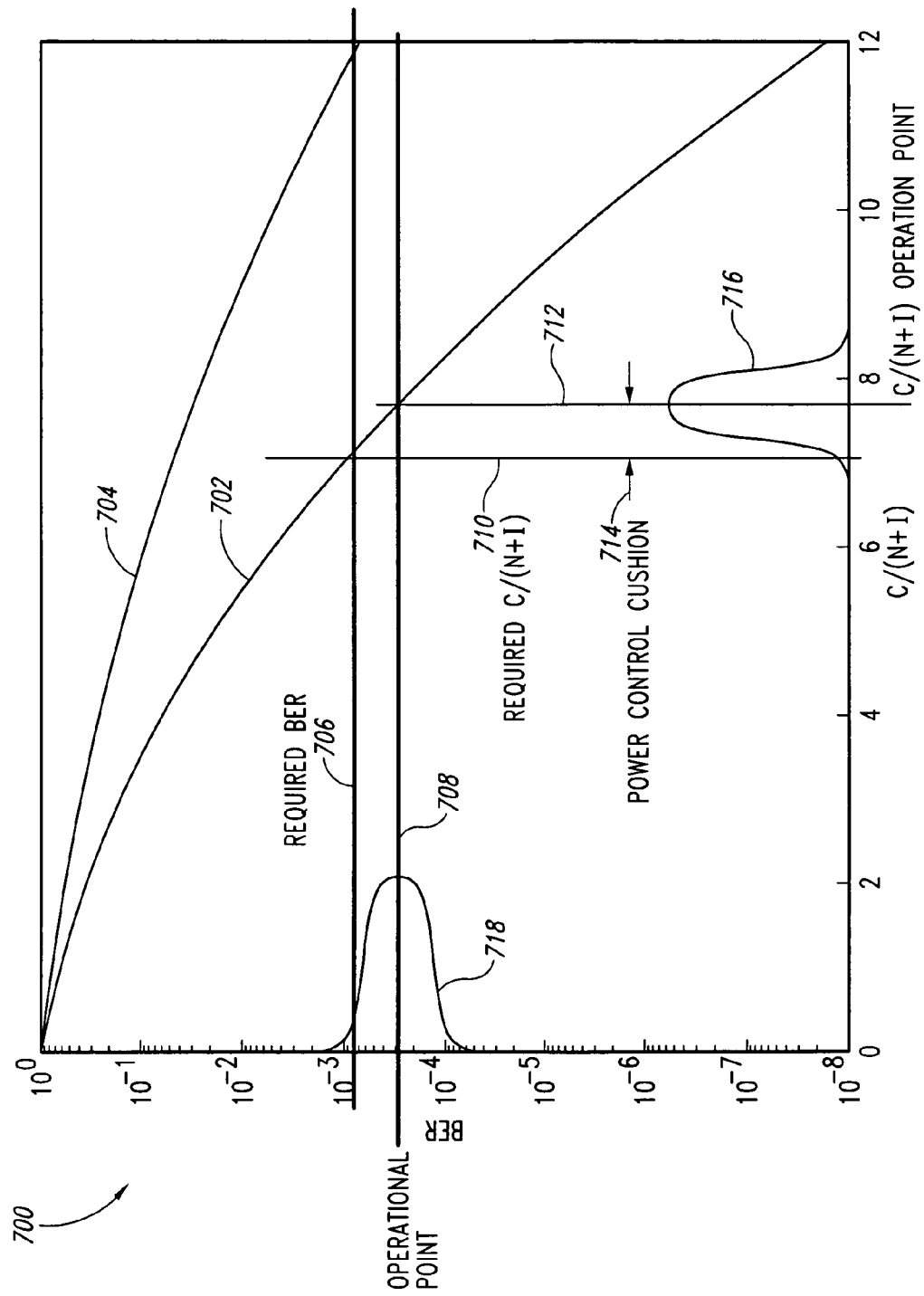
FIG. 7 is a plot of BER vs. carrier-signal-to-noise-ratio illustrating an effect of a channel decoding in accordance with one embodiment of the present invention.

FIG. 7 is a plot 700 of BER vs. carrier-signal-to-noise-ratio illustrating that the power control cushion may directly impact to the system performance. In the perfect power control case, there is no need for power control cushion. The BER requirement showing in 706 can be directly interpolated as line 710. However, in reality, a perfect power control does not exist. The power may be controllable to be distributed in a region as the bell shaped curve, which may be approximately estimated as a Gaussian distributed function, like 716 with its mean represented by line 712. The power level can be, in turn, reflected to the BER axis. So we have 718 reflect to 716 and 708 reflect to 712. In the plot, the average BER is still 706 (note that we have the scale in logarithm). Instead of using the power showing in line 710, we have to use the power as indicated in line 712. The distance from 710 to 712 is the power cushion. Curves 704 and 702 represent BERs as functions of carrier-signal-to-noise-ratio C/(N+I) before and after channel. The above analysis is to the results after channel coding. To reach the BER requirement without channel coding may require a much high input power level and larger power cushion. A high performance channel coding scheme may reduce the required power control cushion. The abscissa may represent C/(N+I) and considered to be proportional to a power level. As can be noticed by comparing the two curves 702 and 704, the BER at the same power level may be reduced significantly by applying the channel decoding technique. An improved channel coding technique may reduce the requirement of power control cushion. With a given channel coding performance, the power control algorithm can further reduced the power control cushion requirements.

The required BER 706 may be specific to each communication system, while the required C/(N+I) 710 may be determined by the required BER and the curve 702. Ideally, the system should communicate at the required BER. However, in normal operations of the system, C/(N+I) may have a distribution 716 around an operational C/(N+I) point 712, where the operational C/(N+I) point 712 may be higher than the required C/(N+I) 710 to provide a power control cushion 714. Likewise, BER may have a similar distribution 718 around the operational BER point 708. Analysis shows that an improvement of 1 dB (from 2 db to 1 db) in the power control cushion 714 can double the system capacity.

Figure 8:
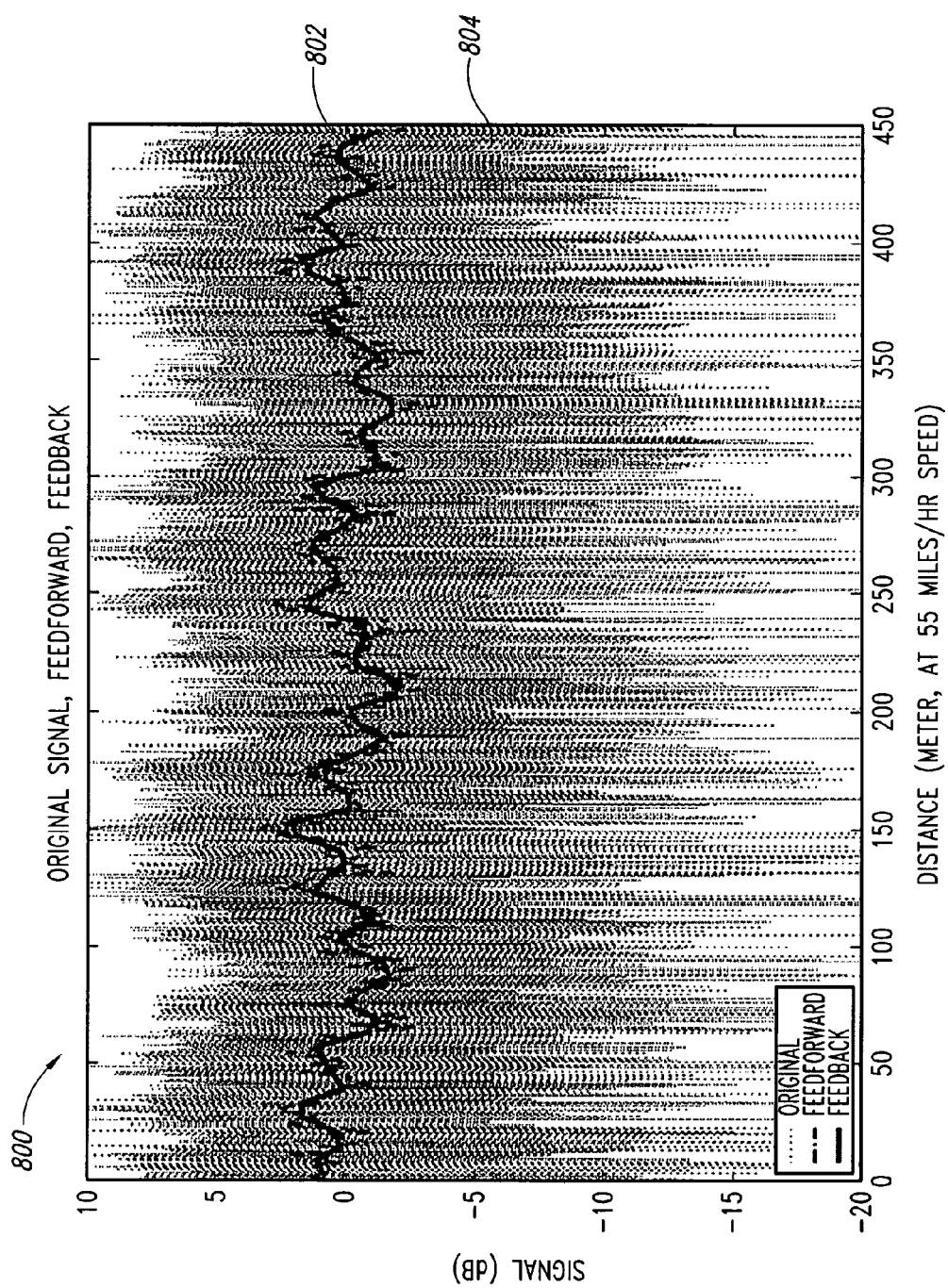
FIG. 8 is a plot of measured and averaged signals in accordance with one embodiment of the present invention.

FIG. 8 is a plot 800 of measured and averaged signals in accordance with one embodiment of the present invention. The abscissa and ordinate of the plot 800 may be the distance traveled by a user terminal 204 and the received signal intensity, respectively. The curve 804 represents signals measured by the use terminal 204 moving at the speed of 55 MPH while the curve 802 represents signals averaged over each frame.

Figure 9A:
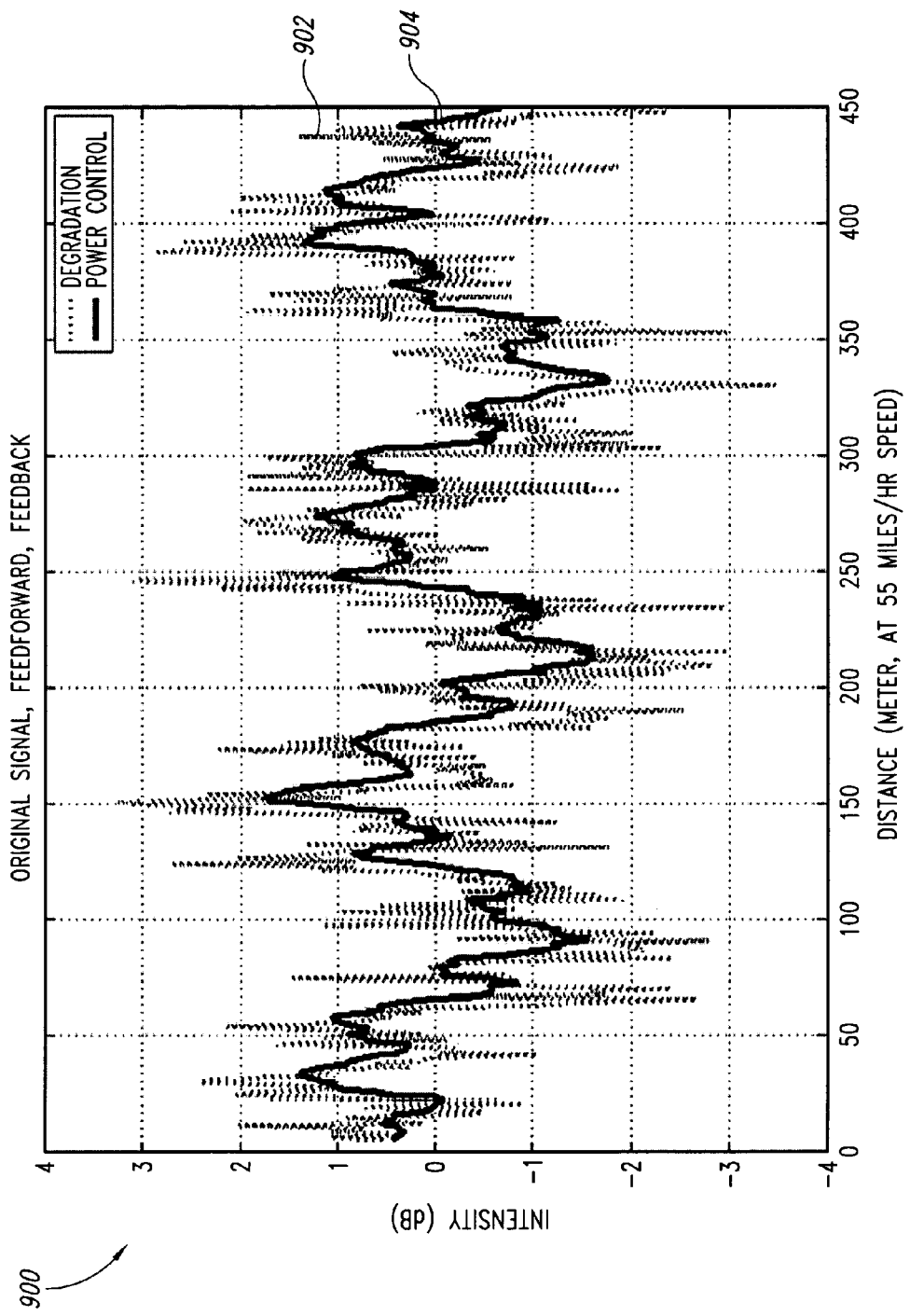
FIG. 9A is a plot of signals illustrating the effect of a power control on an error signal in accordance with one embodiment of the present invention.
Figure 9B:
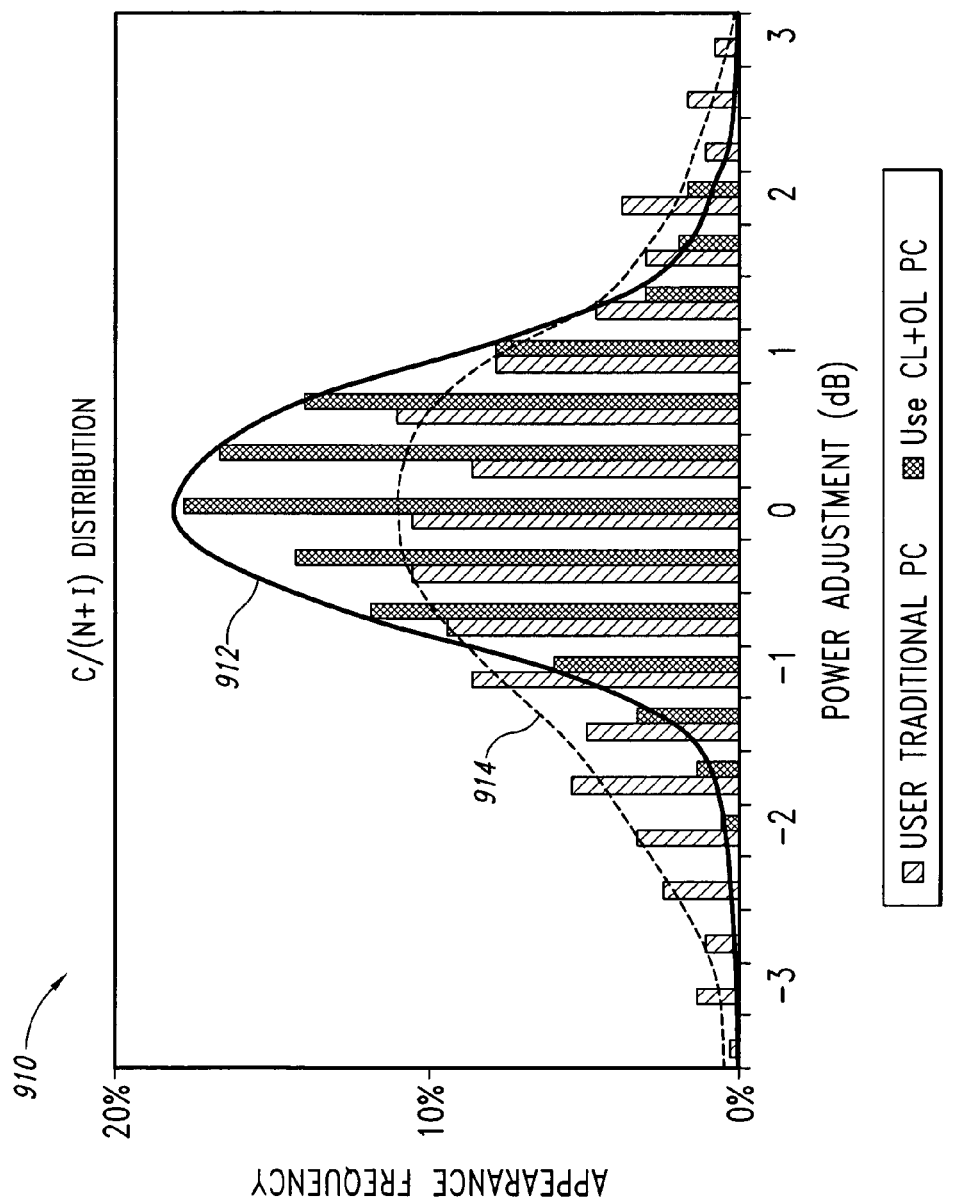
FIG. 9B is a plot of carrier-signal-to-noise-ratio distributions in accordance with one embodiment of the present invention.

FIG. 9A is a plot 900 of signals illustrating the effect of a power control on an error signal in accordance with one embodiment of the present invention. The curves 902 and 904 represent the required power before the power control is performed on the system 200 and the provided power after the power control is performed, respectively. FIG. 9B is a plot of C/(N+I) distributions 910 in accordance with one embodiment of the present invention. The curves 912 and 914 that are similar to the curve 716 represent C/(N+I) distribution with and without power control, respectively. As can be noticed, the C/(N+I) distribution 912 with the power control is narrower, which can translate into a requirement of a smaller power control cushion and an enhanced system performance.

FIG. 10 is a flowchart 1000 illustrating exemplary steps for metric feedback source coding in accordance with one embodiment of the present invention. In step 1002, the gateway station 206 may receive a plurality of input signal frames 602. Next, the received input signal frames may be decoded in step 1004. Then, for each of the decoded plurality of input signal frames, a metric may be calculated in step 1006. Subsequently, an average of the metrics may be calculated in step 1008. In step 1010, a sequence of bits comprising a plurality of synchronization bits and a set of information bits may be selected. Next, in step 1012, the plurality of synchronization bits may be populated by ones, while the set of information bits may be populated by an information bit sequence that represents the value of the calculated average metric. Then, the populated sequence of synchronization bits and set of information bits may be sent to the satellite 202 in step 1014.

FIG. 11 is a flowchart 1100 illustrating exemplary steps for controlling the returnlink power of a user terminal in accordance with one embodiment of the present teachings. In step 1102, the user terminal 204 may receive a broadcasting-signal-to-noise-ratio. Next, a forwardlink carry-signal-to-noise-ratio may be estimated using the received broadcasting-signal-to-noise-ratio in step 1104. In step 1106, forwardlink degradation may be predicted based on the estimated forwardlink carry-signal-to-noise-ratio. The user terminal 204 may also receive an error of a returnlink signal in step 1108. Next, in step 1110, a returnlink carrier-signal-to-noise-ratio may be estimated using the received error. Then, a noise and an interference of the returnlink signal may be predicted in step 1112. In step 1114, a returnlink power signal may be calculated using the predicted forwardlink degradation, noise level, and interference level.

It should be understood, of course, that the foregoing relates to preferred embodiments of the invention and that modifications may be made without departing from the spirit and scope of the invention as set forth in the following claims.

We claim:

1. A method for controlling a returnlink power of a user terminal, said method comprising:
   receiving a broadcasting-signal-to-noise-ratio;
   estimating a forwardlink carrier-signal-to-noise-ratio based on the broadcasting-signal-to-noise-ratio;
   predicting a forwardlink degradation based on the forwardlink carrier-signal-to-noise-ratio;
   receiving an error of a returnlink signal;
   estimating a returnlink carrier-signal-to-noise-ratio based on the error;
   predicting a noise and interference of the returnlink signal; and
   calculating a returnlink power signal based on the forwardlink degradation, noise and interference.

2. The method of claim 1, further comprising:
   using the returnlink power signal in the steps of estimating a returnlink carrier-signal-to-noise-ratio, predicting a forwardlink degradation, and predicting a noise and interference.

3. The method of claim 1, further comprising:
   estimating a set of model parameters to adjust the noise, interference, and a dynamic degradation.

4. The method of claim 3, wherein the step of estimating a set of model parameters is based on a Kalman filter.

5. The method of claim 1, wherein the user terminal is a cellular phone or a personal digital assistant.

6. A method for controlling a returnlink power of a user terminal, said method comprising:
   receiving a broadcasting-signal-to-noise-ratio;
   estimating a forwardlink carrier-signal-to-noise-ratio based on the broadcasting-signal-to-noise-ratio;
   predicting a forwardlink degradation based on the forwardlink carrier-signal-to-noise-ratio;
   calculating adaptively a conelation between a variation of forwardlink signal and a variation of the returnlink signal using a delayed feedback measurement;
   receiving an error of a returnlink signal;
   estimating a returnlink carrier-signal-to-noise-ratio based on the error;
   predicting a noise and interference of the returnlink signal;
   calculating a returnlink power signal based on the forwardlink degradation, noise and interference;
   using the returnlink power signal in the steps of estimating a returnlink carrier-signal-to-noise-ratio, predicting a forwardlink degradation, and predicting a noise and interference; and
   estimating a set of model parameters to adjust the noise, interference, and a dynamic degradation based on a Kalman filter.

7. The method of claim 6, wherein the user terminal is a cellular phone or a personal digital assistant.

8. A computer readable medium embodying program code with instructions for controlling a returnlink power, said computer readable medium comprising:
   program code for receiving a broadcasting-signal-to-noise-ratio;
   program code for estimating a forwardlink carrier-signal-to-noise-ratio based on the broadcasting-signal-to-noise-ratio;
   program code for predicting a variation of forwardlink degradation based on a variation of the forwardlink canier-signal-to-noise-ratio;
   program code for receiving an error of a returnlink signal;
   program code for estimating a returnlink carrier-signal-to-noise-ratio based on the error;
   program code for predicting a noise and interference of the returnlink signal; and
   program code for calculating a returnlink power signal based on the forwardlink degradation, noise and interference.

9. The computer readable medium of claim 8, wherein said computer readable medium comprises program code for using the returnlink power signal in a process of executing the program codes for estimating a returnlink carrier-signal-to-noise-ratio, predicting a forwardlink degradation, and predicting a noise and interference.

10. The computer readable medium of claim 8, wherein said computer readable medium comprises program code for estimating a set of model parameters to adjust the noise, interference, and a dynamic degradation.

11. The computer readable medium of claim 8, wherein the program code for estimating a set of model parameters is based on a Kalman filter.

12. The computer readable medium of claim 8, wherein the user terminal is a cellular phone or a personal digital assistant.

13. A satellite communication system, comprising:
a satellite; and
at least one user terminal comprising:
a forwardlink receiver configured to receive a forwardlink broadcasting signal and a forwardlink user-data transmission signal from the satellite;
a returnlink power control configured to generate a returnlink power signal based on the forwardlink broadcasting signal and the forwardlink user-data transmission signal; and
a returnlink transmission configured to send the returnlink power signal to the satellite
a gateway station configured to communicate with the satellite, wherein the gateway station further comprises:
a feederlink receiver configured to receive a first signal from the satellite; and
a feederlink transmission configured to receive a metric and a pilot tune signal power from the feederlink receiver and send a second signal to the satellite, wherein the second signal is based on the first signal, the metric, and the pilot tune signal power.

14. The satellite communication system of claim 13, wherein the at least one user terminal communicates with the satellite via a channel having a static degradation mechanism and a dynamic degradation mechanism.

15. The satellite communication system of claim 14, wherein the static degradation mechanism is in out-space region.

16. The satellite communication system of claim 14, wherein the dynamic degradation mechanism is in atmosphere.

17. The satellite communication system of claim 13, wherein the at least one user terminal is a cellular phone or a personal digital assistant.

18. A satellite communication system, comprising:
a satellite;
at least one user terminal configured to communicate with the satellite via a channel, said at least one user terminal comprising:
a forwardlink receiver configured to receive a forwardlink broadcasting signal and a forwardlink user-data transmission signal from the satellite;
a returnlink power control configured to generate a returnlink power signal based on the forwardlink broadcasting signal and the forwardlink user-data transmission signal; and
a returnlink transmission configured to send the returnlink power signal to the satellite; and
a gateway station configured to communicate with the satellite comprising:
a feederlink receiver configured to receive a first signal from the satellite; and
a feederlink transmission configured to receive a metric and a pilot tune signal power from the feederlink receiver and send a second signal to the satellite, wherein the second signal is based on the first signal, the metric, and the pilot tune signal power.

19. A method for controlling a returnlink power of a user terminal, said method comprising:
receiving a returnlink and a returnlink power;
estimating a returnlink carrier-signal-to-noise-ratio based on the returnlink error and returnlink power;
predicting a noise and interference of the returnlink power based on the returnlink carrier-signal-to-noise-ratio and the returnlink power;
receiving a forwardlink power;
estimating a forwardlink caffier-signal-to-noise-ratio based on the forwardlink power;
calculating adaptively a correlation between a variation of the forwardlink power and a variation of the returnlink power;
predicting a forwardlink degradation based on the forwardlink carrier-signal-to-noise-ratio, the correlation and the returnlink power; and
computing a returnlink power based on the noise, the interference and the forwardlink degradation.

20. The method of claim 19, further comprising:
estimating a set of model parameters to adjust the noise, the interference, and a dynamic degradation based on a Kalman filter.

21. The method of claim 19, wherein the user terminal is a cellular phone or a personal digital assistant.

22. A computer readable medium embodying program code with instructions for controlling a returnlink power, said computer readable medium comprising:
program code for receiving a returnlink error and a returnlink power;
program code for estimating a returnlink carrier-signal-to-noise-ratio based on the returnlink error and returnlink power;
program code for predicting a noise and interference of the returnlink power based on the returnlink carrier-signal-to-noise-ratio and the returnlink power;
program code for receiving a forwardlink power;
program code for estimating a forwardlink carrier-signal-to-noise-ratio based on the forwardlink power;
program code for calculating adaptively a correlation between a variation of the forwardlink power and a variation of the returnlink power;
program code for predicting a forwardlink degradation based on the forwardlink carrier-signal-to-noise-ratio, the correlation and the returnlink power; and
program code for computing a returnlink power based on the noise, the interference and the forwardlink degradation.

23. The computer readable medium of claim 22, wherein said computer readable medium comprises program code for estimating a set of model parameters to adjust the noise, the interference, and a dynamic degradation.

24. The computer readable medium of claim 23, wherein the program code for estimating a set of model parameters is based on a Kalman filter.

* * * * *

UNITED STATES PATENT AND TRADEMARK OFFICE
CERTIFICATE OF CORRECTION

PATENT NO. : 7,599,659 B2 Page 1 of 1
APPLICATION NO. : 11/078865
DATED : October 6, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this

Twenty-eighth Day of September, 2010

David J. Kappos
*Director of the United States Patent and Trademark Office*